US 11,207,649 B2

(12) United States Patent
Hoffman et al.

(10) Patent No.: US 11,207,649 B2
(45) Date of Patent: Dec. 28, 2021

(54) SYNTHESIS GAS REACTOR TUBES AND REACTORS AND RELATED SYSTEMS AND PROCESSES

(71) Applicant: West Biofuels, LLC, Petaluma, CA (US)

(72) Inventors: Matthew B. Hoffman, Woodland, CA (US); Matthew D. Summers, Woodland, CA (US)

(73) Assignee: West Biofuels, LLC, Petaluma, CA (US)

( * ) Notice: Subject to any disclaimer, the term of this patent is extended or adjusted under 35 U.S.C. 154(b) by 98 days.

(21) Appl. No.: 16/352,615

(22) Filed: Mar. 13, 2019

(65) Prior Publication Data
US 2019/0282986 A1  Sep. 19, 2019

Related U.S. Application Data

(60) Provisional application No. 62/642,714, filed on Mar. 14, 2018, provisional application No. 62/642,716, filed on Mar. 14, 2018.

(51) Int. Cl.
B01J 8/04 (2006.01)
B01J 8/06 (2006.01)
C01B 3/02 (2006.01)
B01J 37/20 (2006.01)
C01B 3/16 (2006.01)

(52) U.S. Cl.
CPC .......... B01J 8/0461 (2013.01); B01J 8/0492 (2013.01); B01J 8/065 (2013.01); B01J 37/20 (2013.01); C01B 3/02 (2013.01); C01B 3/16 (2013.01); B01J 2208/00017 (2013.01); C01B 2203/061 (2013.01); C01B 2203/1076 (2013.01); C01B 2203/1614 (2013.01)

(58) Field of Classification Search
None
See application file for complete search history.

(56) References Cited

U.S. PATENT DOCUMENTS

| | | | |
|---|---|---|---|
| 4,101,376 A * | 7/1978 | Cornelius | B01J 8/062 252/373 |
| 5,000,926 A | 3/1991 | Murayama et al. | |
| 5,266,281 A | 11/1993 | Kao et al. | |
| 5,935,531 A * | 8/1999 | Giacobbe | B01J 8/065 422/652 |
| 6,218,439 B1 * | 4/2001 | Kobayashi | C07C 29/1518 518/713 |
| 7,189,379 B2 * | 3/2007 | Kobayashi | B01J 8/065 422/652 |
| 9,403,738 B2 | 8/2016 | Skowerski | |
| 2004/0249203 A1 * | 12/2004 | Yada | C07C 45/35 562/545 |
| 2017/0021324 A1 | 1/2017 | Blanchet et al. | |
| 2019/0275494 A1 * | 9/2019 | Ulber | B01J 8/062 |

* cited by examiner

Primary Examiner — Jennifer A Leung
(74) Attorney, Agent, or Firm — Armstrong Teasdale LLP

(57) ABSTRACT

Methods, reactor tubes, reactors, and systems for catalysis are disclosed. A reactor tube includes an outer shell defining a catalyst bed, a catalyst within the catalyst bed, and an inner tube extending through the catalyst bed. An interior of the inner tube is isolated from the catalyst within the catalyst bed. Methods of activating a catalyst are also disclosed herein.

17 Claims, 12 Drawing Sheets

SYNTHESIS GAS REACTOR TUBES AND REACTORS AND RELATED SYSTEMS AND PROCESSES

CROSS-REFERENCE TO RELATED APPLICATIONS

The application claims the benefit of U.S. Provisional Patent Application No. 62/642,716, filed Mar. 14, 2018 and titled METHODS, REACTORS, AND SYSTEMS FOR IMPROVING THE EFFICIENCY OF COMMERCIAL-SCALE SYNTHESIS OF PRODUCTS FROM SYNGAS, and U.S. Provisional Patent Application No. 62/642,714, filed Mar. 14, 2018 and titled IN-SITU SULFIDATION PROCESS AND ASSOCIATED SYSTEMS FOR A CATALYTIC REACTOR, the entire disclosures of which are hereby incorporated herein by reference.

FIELD OF THE INVENTION

The present disclosure relates to chemical reactors. In particular, the present disclosure relates to synthesis gas reactor tubes and reactors and related systems and processes.

BACKGROUND

Synthesis gas ("syngas") is a fluid comprised primarily of diatomic hydrogen ($H_2$) and carbon monoxide (CO). Syngas can include other components and varies in composition. Syngas can also contain elements harmful to some catalytic compounds, such as hydrogen sulfide and other sulfur compounds. Syngas can be obtained from a number of sources, including reforming of natural gas or gasification of waste, biomass, coal or other organic material. Syngas can be used to produce a variety of products including alcohols, Fischer-Tropsch (FT) chemicals, synthetic hydrocarbons, hydrogen, etc.

Products from syngas are generally produced using a catalytic reaction in a reactor vessel. Syngas-based reactions tend to be highly exothermic with the ability to initiate a runaway reaction potentially fatal to the catalyst and reactor vessel. A need exists for reactors, systems, and processes for producing products from syngas.

Additionally, metal sulfide catalysts are widely used in a variety of chemical reactors including reactors designed for the production of chemical products. Prior to use in the reactor, metal sulfide catalysts involve "activation" where metal oxides are converted to metal sulfides within the catalyst. A need exists for processes for activating metal sulfide catalysts.

BRIEF DESCRIPTION OF THE SEVERAL VIEWS OF THE DRAWINGS

The embodiments disclosed herein will become more fully apparent from the following description and appended claims, taken in conjunction with the accompanying drawings. The drawings depict primarily generalized embodiments, which embodiments will be described with additional specificity and detail in connection with the drawings in which:

DETAILED DESCRIPTION

Figure 1:
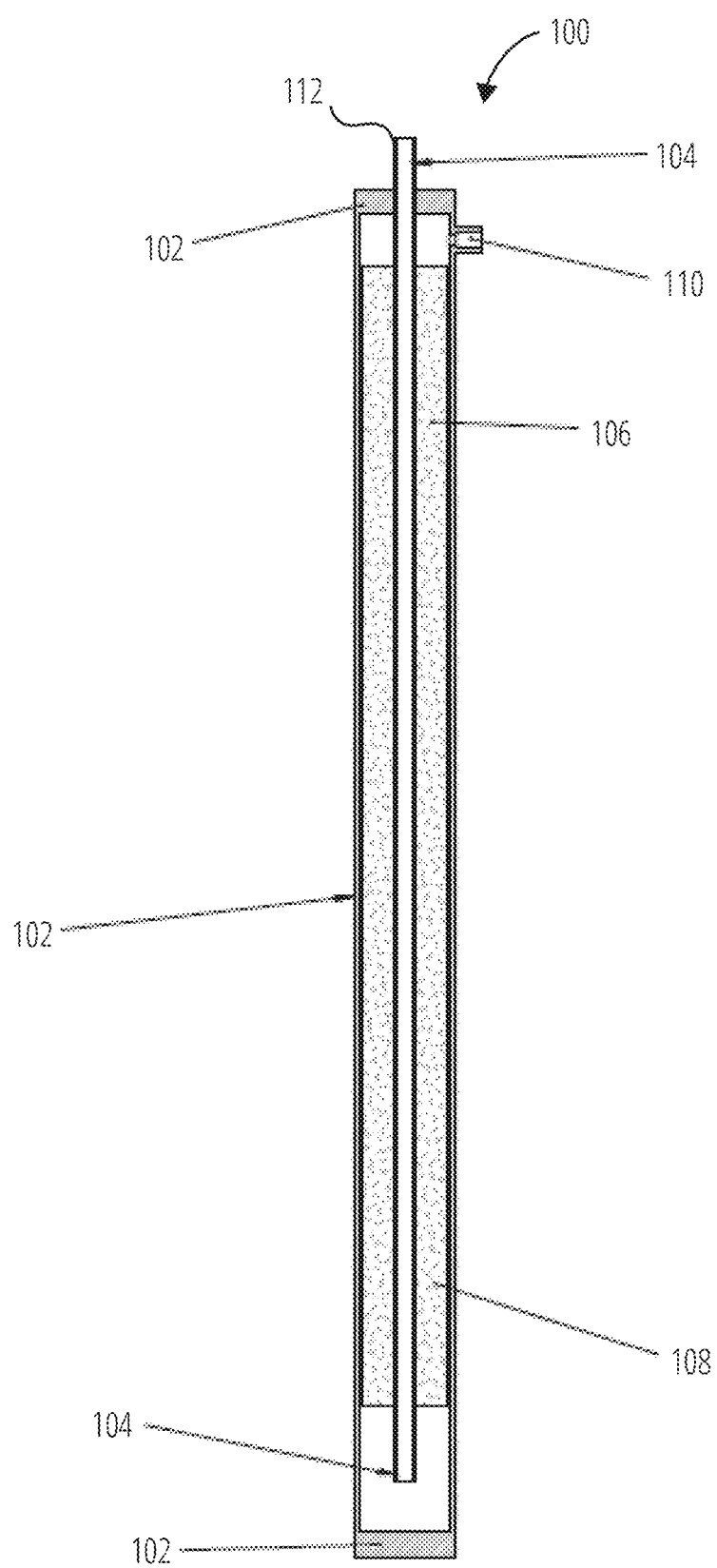
FIG. 1 is a cross-sectional view of an individual reactor tube, according to one embodiment disclosed herein.

Syngas-based reactions generally encounter several complications in commercial-scale reactor deployment. One such complication is control of temperature throughout the volume of required catalyst. Syngas-based reactions tend to be highly exothermic with the ability to initiate a runaway reaction potentially fatal to the catalyst and reactor vessel. Reactor design/configuration is dictated by the exothermic nature of the synthesis reaction; and the physical properties of the reactor, reactants and catalyst. In order to maintain conditions favorable to product formation the temperature of the reaction is closely controlled. One such temperature control of note is the temperature gradient across the catalyst bed (plane perpendicular to flow).

The internal temperature, including gradient across the bed of catalyst is often controlled by, for example, limiting the size (diameter) of the reactor tube containing catalyst, dilution of catalyst or reactants with non-reactive agents, or both. These approaches hinder commercial-scale reactor design and deployment in a commercial capacity. The above mentioned methods significantly reduce catalyst/reactor output/efficiency, increase complexity/installation cost, or both. For example, limiting the diameter of the reactor tube limits the maximum radial distance between thermal boundaries (for example, tube walls) of the catalyst. Dilution of the reactants or the catalyst with non-reacting agents decreases the efficiency of the reactor and the catalyst.

Reactors are disclosed in the drawings and discussed below. Methods are disclosed herein wherein syngas is brought into contact with a catalyst resulting in a desirable chemical reaction. The methods provide stabilization of the reaction in a compact, efficient manner, potentially allowing for successful commercial-scale deployment.

As used herein, the term "catalyst" includes a material that facilitates a chemical reaction. As used herein, the term "fluid" refers to any non-solid, such as gases, vapors, and liquids.

In certain embodiments, the reactors disclosed herein, include one or more reactor tubes wherein catalyst is retained. Each individual reactor tube contains at least one internal tube or tubes of smaller size, that is internally absent of catalyst. The outer tube is separated from the internal tubes at one end and in communication with them at the opposing end. The internal tubes provide a transport pathway for reaction fluids from one end of the reactor to the other separate and independent of the catalyst. Additionally, the internal tubes provide a boundary within the catalyst wherein heat is transferred between the catalyst and the fluid flow within the internal tubes.

FIG. 1 is a cross-sectional view of an individual reactor tube 100, according to one embodiment disclosed herein. Catalyst 106 is contained within a suitable structure such as a pipe or a tube. This outer structure, being sealed at both ends, forms an outer shell 102. The volume enclosed by the outer shell 102 forms a catalyst containment vessel (sometimes referred to herein as the "catalyst bed 108"). A profiling thermocouple 112 can be inserted and configured in such a way as to penetrate the outer shell 102, and measure the temperature profile through the catalyst bed 108 within the individual reactor tube 100. For example, the profiling thermocouple 112 may extend at least substantially through the catalyst bed 108. As used herein, the phrase "at least substantially" indicates accuracy within at least a certain amount (e.g., including 80%, 90%, 95%, 98%, 99%, 99 and some fraction of a percent, 100% accuracy etc.). As a result, the one or more tubes 104 are configured in such a way as to penetrate the outer shell 102, and allow fluid to flow through the individual reactor tube 100 without contacting the catalyst 106. Inner tubes of the profiling thermocouple 112 are sealed to the outer shell 102 at the penetration interface where the one or more tubes 104 interface with the outer shell 102. The inner tubes of the profiling thermocouple 112 are in communication with the catalyst 106, which is contained in the volume enclosed by the outer shell 102. The outer shell 102 contains a passageway 110 positioned in such a way that fluid flows are directed through the entire volume of catalyst 106 and then through another passage (not shown) of the outer shell 102.

The outer shell 102 is contained within a temperature controlled environment, usually having a thermal fluid that can dissipate heat generated within the individual reactor tube 100. A benefit of the design of the individual reactor tube 100 of FIG. 1 is that exotherm can be controlled such that the in-situ catalyst 106 is not overheated or underheated. One of ordinary skill in the art, with the benefit of this disclosure, would understand that variations to the individual reactor tube 100 of FIG. 1 could be made that still allow for in-situ catalyst conversion. After completion of in-situ activation, the activated catalyst 106 and individual reactor tube 100 can be used for the production of chemical products from syngas.

Figure 5:
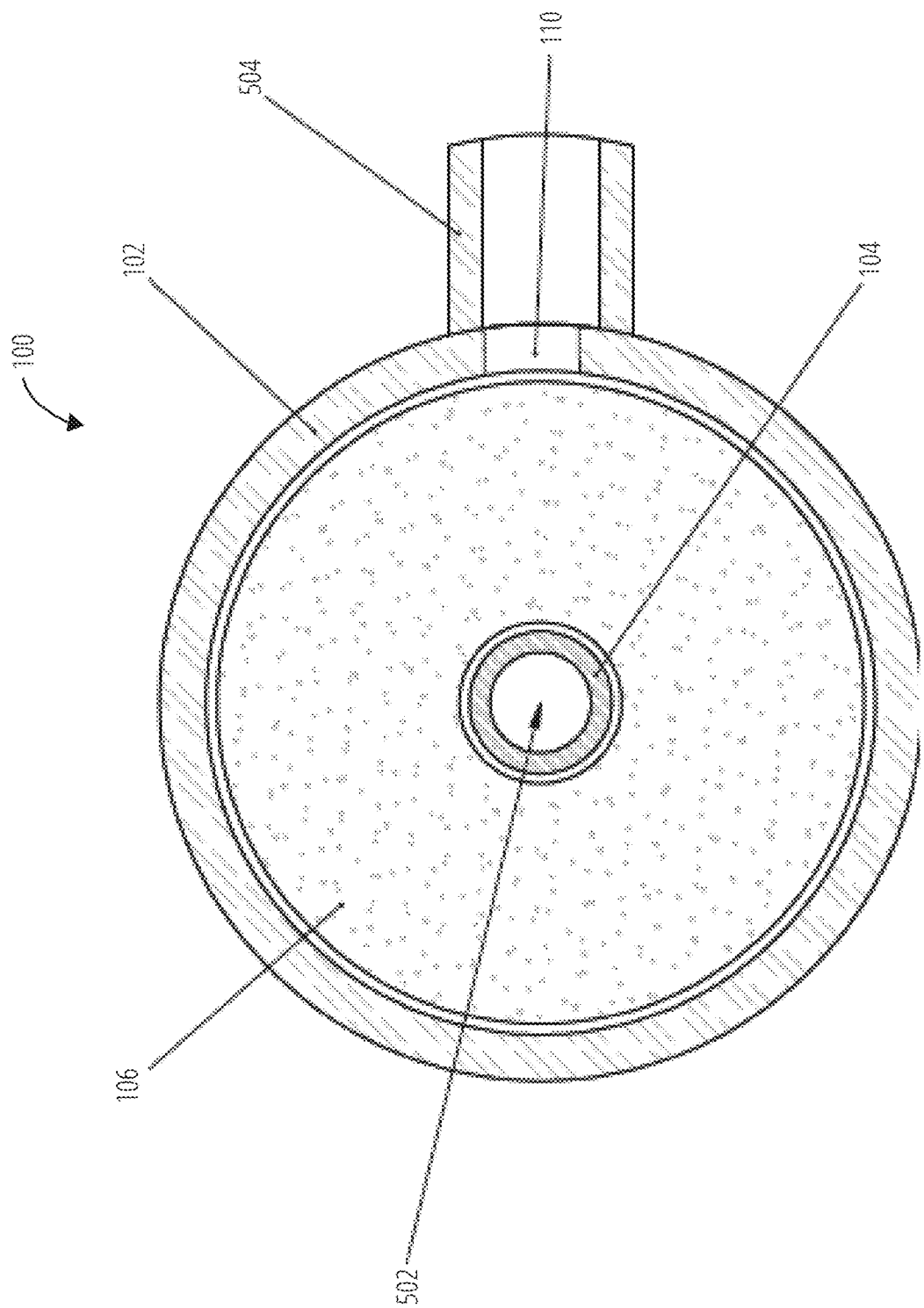
FIG. 5 is another cross-sectional view of the individual reactor tube of FIG. 1.

FIG. 5 is another cross-sectional view of the individual reactor tube 100 of FIG. 1, the cross-section taken perpendicularly to a flow of fluids within the individual reactor tube 100. The catalyst 106 is enclosed by the outer shell 102 and an inner passageway 502 that is enclosed by a pipe or tube (e.g., the one or more tubes 104 of FIG. 1). The outer shell 102 contains a passageway 110 to allow fluid flow to or from the individual reactor tube 100 through process piping 504.

Figure 6:
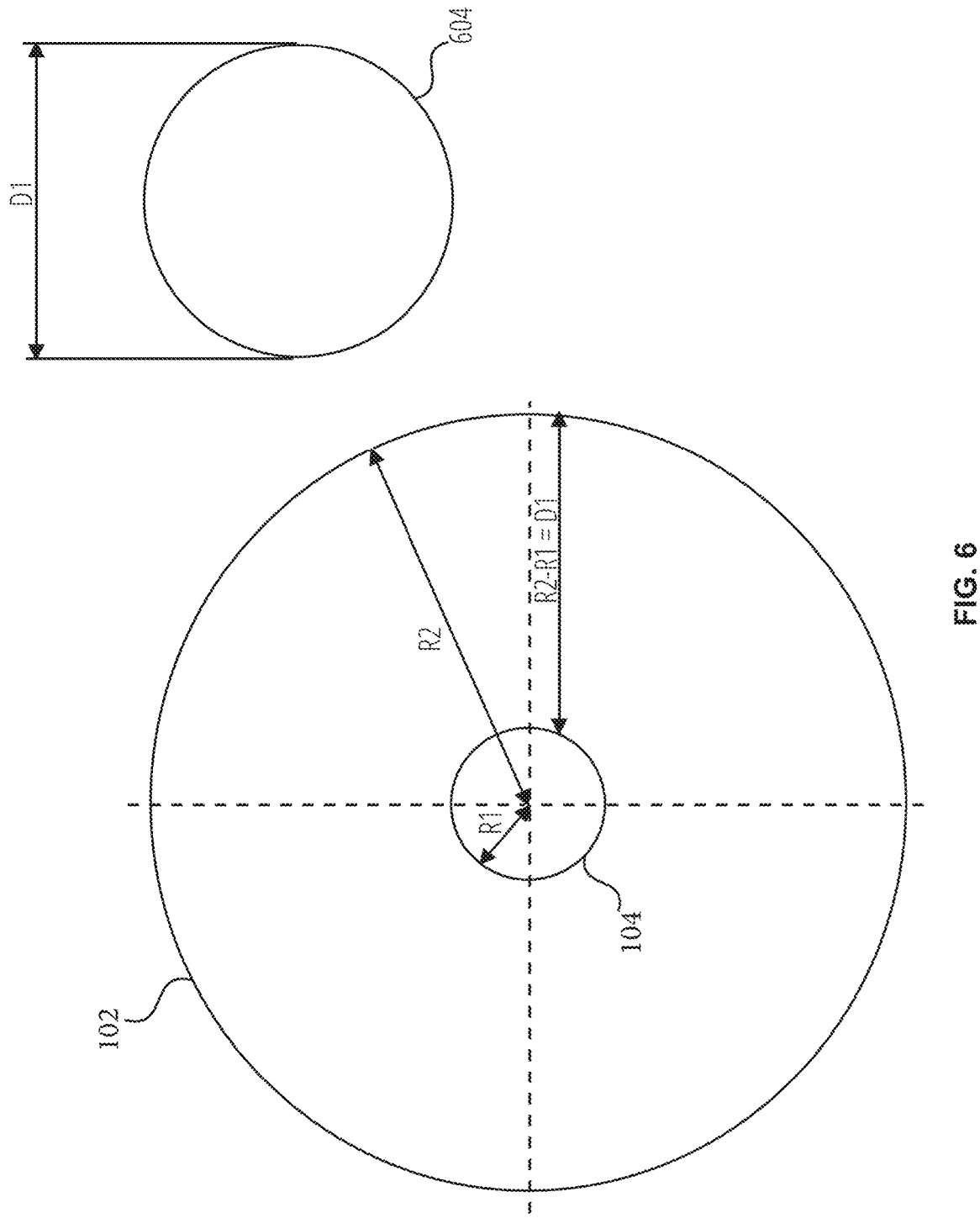
FIG. 6 illustrates geometric benefits of the individual reactor tube of FIG. 1 and FIG. 5.

FIG. 6 illustrates geometric benefits of the individual reactor tube 100 of FIG. 1 and FIG. 5. FIG. 6 illustrates a geometric cross-section of reactor tube 100. The distance between the inner surface of outer shell 102 and the outer surface of tube 104 is equal to D1. R1 represents the radius of the outer surface of the tube 104. R2 represents the radius of the inner surface of the outer shell 102. R2 is selected such that the distance between R2 and R1 equals D1. Generally speaking, each catalyst has a critical dimension, D1, whereby the thermal control of the reaction is optimized for that particular catalyst composition and structure. For a monolithic catalyst, it is the critical dimension of an individual monolith. For a bulk catalyst, it is the critical dimension of the catalyst particles as a group.

For purposes of comparison, FIG. 6 also illustrates a cross-section 604 of a prior art reactor tube filled with catalyst and without an inner passageway. The diameter of the prior art reactor tube is limited to D1, to allow for sufficient heat transfer to and from the catalyst-filled tube.

It can be seen and determined from the geometry that the catalyst area for the reactor tube 100 is at least four (4) times that of the cross-section 604 when the dimension of the inner tube 104 is small. As the inner tube 104 increases in dimension, the area of the individual reactor tube 100 increases, which can add to the benefit.

This geometry of the cross-section of the reactor tube 100 (e.g., having the inner tube 104) has benefits to the material cost, function, and maintenance of the reactor (e.g., the individual reactor tube 100) as compared to a reactor having tubes with the cross-section 604. In one example, if the reactor tube radius, R2, is ten (10) times the radius R1 of the inner tube 104, then the area of the catalyst would be 4.8 times that of a reactor tube having the cross-section 604 (assuming a diameter D1=R2−R1). In another example, if the reactor tube radius, R2, is two times the radius R1 of the inner passageway 502, then the area of the catalyst would be twelve (12) times that of the reactor tube having the cross-section 604. In effect, each reactor tube 100 acts as a collection of many single reactor tubes having the cross-section 604.

Figure 7:
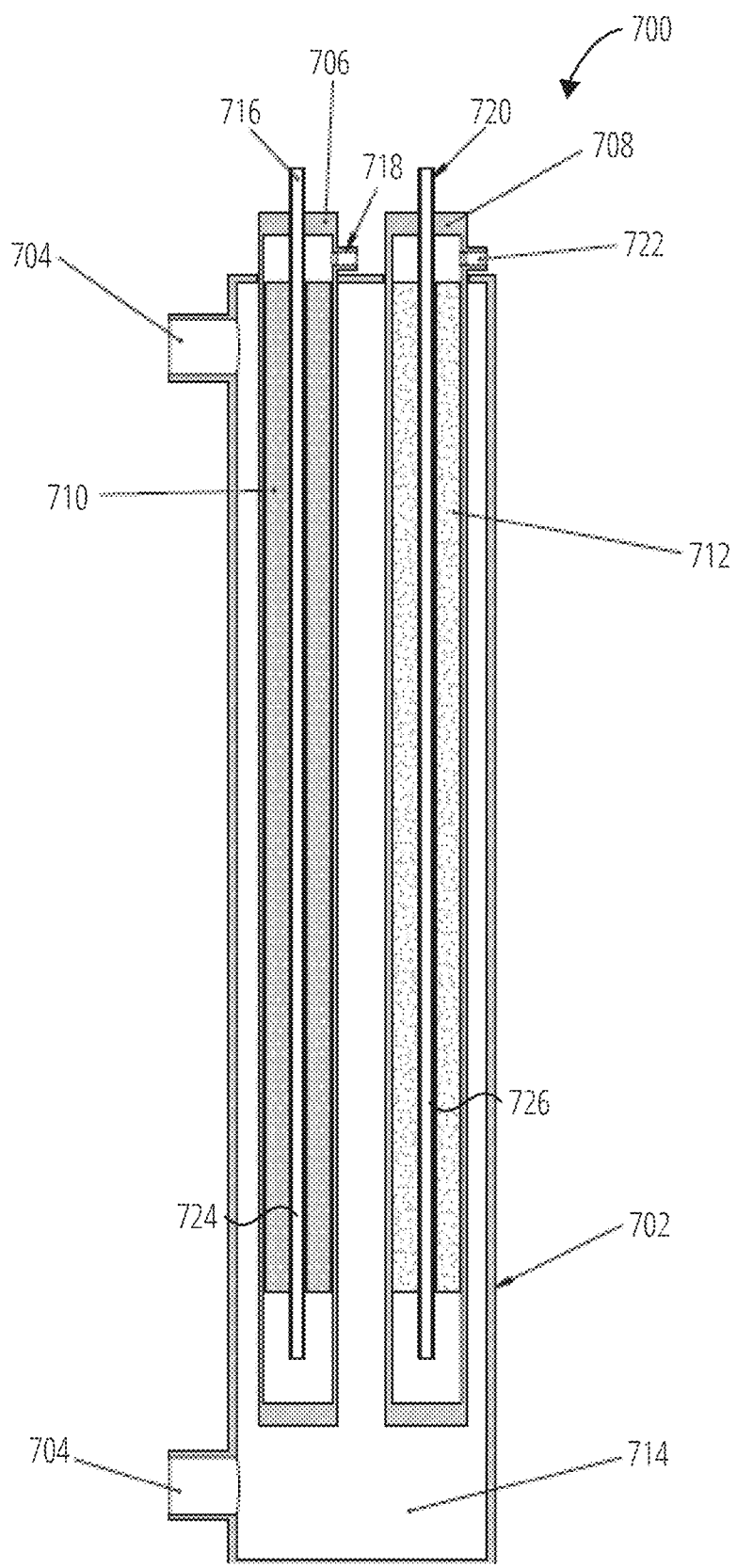
FIG. 7 is a cross-sectional view of a reactor vessel, according to one embodiment disclosed herein.

FIG. 7 is a cross-sectional view of a reactor vessel 700, according to one embodiment disclosed herein. Two or more reactor tubes, including reactor tube 706 and reactor tube 708, each similar to the individual reactor tube 100 of FIG. 1, are enclosed within a fluid jacket 702. Passageways 704 are provided to circulate fluid throughout the fluid jacket 702 and around the reactor tubes (reactor tube 706 and reactor tube 708). One or more of the reactor tubes (including reactor tube 708) are filled with a catalyst 712 and used as "active" reaction sections. Accordingly, the reactor tube 708 is used as an "active" reaction section. One or more others of the reactor tubes (including reactor tube 706) are filled with a solid non-reacting media 710, such as glass beads, and used to modify the temperature of reactants, serving as "thermal" sections. Accordingly, reactor tube 706 serves as a "thermal" section. The reactor vessel 700 contains one or more of each configuration of reactor tube 706 and reactor tube 708. The desired capacity of the reactor vessel 700 dictates the total quantity of each reactor tube.

The reactor tubes (e.g., reactor tube 706 and reactor tube 708) have passages where reaction fluids can exit (e.g., passage 716 of reactor tube 706 and passage 720 of reactor tube 708) and enter (e.g., passage 718 of reactor tube 706 and passage 722 of reactor tube 708) each individual reactor tube. The passages (passage 716, passage 718, passage 722, and passage 720), are interconnected in differing ways depending on the embodiment.

In the embodiment of FIG. 7, reaction component fluids (reactants) flow into the one or more thermal sections (e.g., reactor tube 706) through passage 718. As used herein, the term "reactants" refers to a pre-reaction state of components to include recycled (e.g., previously unreacted) and/or virgin unreacted components. Reactants flow through the non-reacting media 710, modifying the temperature of the reactants. Reactants then flow through the internal tube (inner passageway 724 of reactor tube 706) and exit the thermal sections through the passage 716. The exit (passage 716) of the one or more thermal sections is connected to the inlet (passage 722) of the one or more active sections (e.g., reactor tube 708). Reactant is reacted with the catalyst 712, producing reaction "products." As used herein, the term "products" refers to the post-reaction state of components to include reacted and unreacted components. The products then flow through the internal tube (e.g., inner passageway 726) of the one or more reactor sections (e.g., reactor tube 708).

The reactor product fluid flow contained in the internal tubes (e.g., in the inner passageway 726) possesses a temperature roughly equal to the average temperature within the catalyst 712. This allows this internal tube (inner passageway 726) to be an insulating boundary of the catalyst 712 with the ability to absorb and remove heat by established laws of thermodynamics. This boundary serves to increase the maximum radial thickness of the catalyst within the reactor tube (e.g., reactor tube 708) while maintaining the thermal control of the reaction. The design allows the catalyst 712 in the reactor tube 708 to behave thermally as a much smaller single reactor tube with no internal passageway.

In another embodiment, the reactor vessel 700 of FIG. 7 containing one or more reactor tubes is configured such that all the reactor tubes are "active" (all are similar to reactor tube 708) and filled with catalyst 712. Reactants are flowed through the inner passageway 726 before passing into the catalyst 712. The reactants are flowed through the catalyst 712 to produce reaction products. The reaction products exit each reactor tube 708 through process piping (e.g., via passage 722). The reactants, upon entering the internal tubes (each inner passageway 726), have a temperature lower than that of the catalyst 712. Therefore, the reactants remove heat from the catalyst bed (e.g., the catalyst bed 108 of reactor tube 100). The method of this embodiment is similar in effect to the embodiment that utilizes at least one reactor tube 706 in the thermal configuration.

In yet another embodiment, reactor tubes from the above two embodiments have passages strategically placed allowing reactants to flow between the catalyst volume and the internal tubes (e.g., inner passageway 726). The passages are placed at various locations providing additional control of reactant/reaction/product placement and evolution within the reactor tubes. An additional feature that could be added would be flow control within the internal tubes that might be turned on and off or modulated to give different desired effects. This could be achieved with various known methods including thermal metals to turn off or on tubes at various temperatures.

Figure 8:
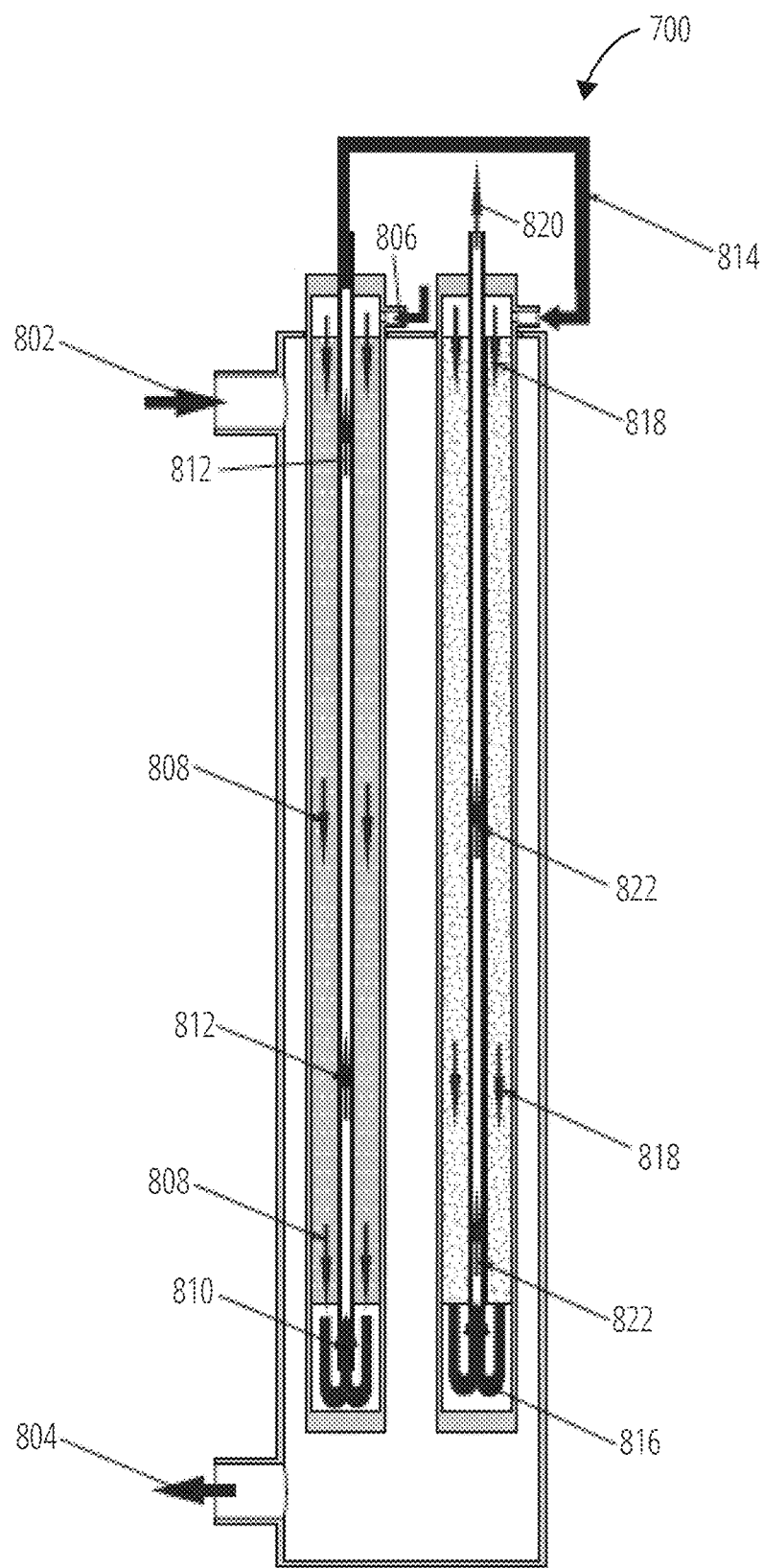
FIG. 8 is a cross-sectional view of the reactor vessel of FIG. 7, illustrating fluid flow according to one embodiment disclosed herein.

FIG. 8 is a cross-sectional view of the reactor vessel 700 of FIG. 7, illustrating fluid flow according to one embodiment disclosed herein. Referring to FIG. 7 and FIG. 8 together, thermal fluid such as molten salt, oil, water etc. is circulated through an inlet 802 and an outlet 804 provision of the thermal jacket (fluid jacket 702). Reactants flow 806 through the thermal section (e.g., the reactor tube 706) and pass 808 through the media bed (the space occupied by the non-reacting media 710). The reactants flow 810 from the media bed into the internal tube (e.g., the inner passageway 724). The reactants continue to flow 812 up the internal tube (inner passageway 724) and flow 814 into the inlet (passage 722) of the active reactor section (reactor tube 708). Reactants then flow 818 through and are reacted with the catalyst 712, becoming products. The products flow 816 into the internal tube (inner passageway 726) of the active reactor section (reactor tube 708). The product flow 822 continues up the internal tube (inner passageway 726) and then exits 820 the reactor vessel 700.

Systems for converting syngas may use product specific catalysts, reactors, and operational parameters. Optimizing production of products can be achieved by unique combinations of reactor design and operational parameters that suit a particular syngas and catalyst.

Figure 9:
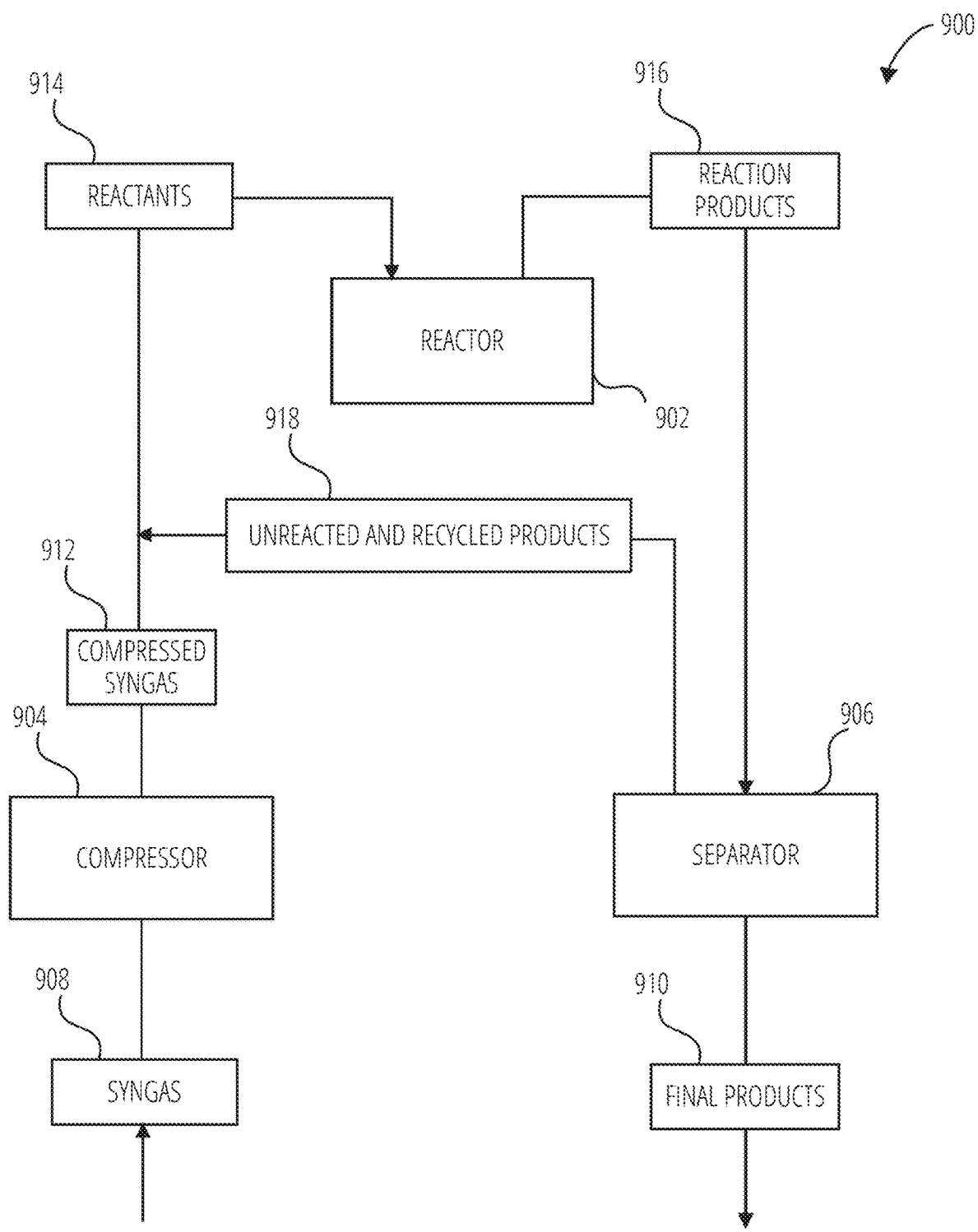
FIG. 9 is a block diagram of a reactor system, according to one embodiment disclosed herein.

Systems for converting syngas to useful products are also disclosed herein. FIG. 9 is a block diagram of a reactor system 900 according to one embodiment disclosed herein. The reactor system 900 includes a compressor 904, a reactor 902 (such as including reactor tube 100) and a separator 906. Syngas 908 is compressed (using the compressor 904) and sent to a reactor vessel (the reactor 902), as discussed above. The compressed syngas 912 may, if desired, be combined with unreacted and recycled products 918 from a later process. The compressed syngas, with or without the additional unreacted and recycled products 918, form the reactants 914, which are fed to the reactor 902. The reactants 914 undergo a catalytic reaction process forming reaction products 916. The reaction products 916 are fed to a separator 906 where the reaction products 916 undergo a selective separation process. In the selective separation process desired elements (e.g., final products 910), unreacted elements (e.g., the unreacted and recycled products 918), and undesirable elements are separated into differing product streams. The unreacted and recycled products 918 products can then be reintroduced into the reactor inlet.

It should be understood that the illustrated embodiments in FIG. 1, FIG. 5, FIG. 6, FIG. 7, FIG. 8, and FIG. 9 may be used with a variety of syngas reactors, such as mixed alcohol synthesis (MAS) reactors, FT hydrocarbon synthesis reactors, methanol reactors, methane reactors, water-gas shift reactors, etc. Non-limiting examples of catalysts that may be used include: Cu/ZnO for water-gas shift hydrogen production; Cu/ZnO/Al2O3 for methanol production; Ni-based catalysts for methane synthesis; K/Cu/Zn/Mn/Co/Cr2O3, K/MoS2, K/Co/MoO2, Rh/Mn/SiO2, Rh/Mn/Fe/SiO2, Rh/Zn/SiO2, and Rh/Zn/Pd/SiO2 for mixed alcohol synthesis; and cobalt and iron-based catalysts for FT hydrocarbon synthesis.

Figure 10:
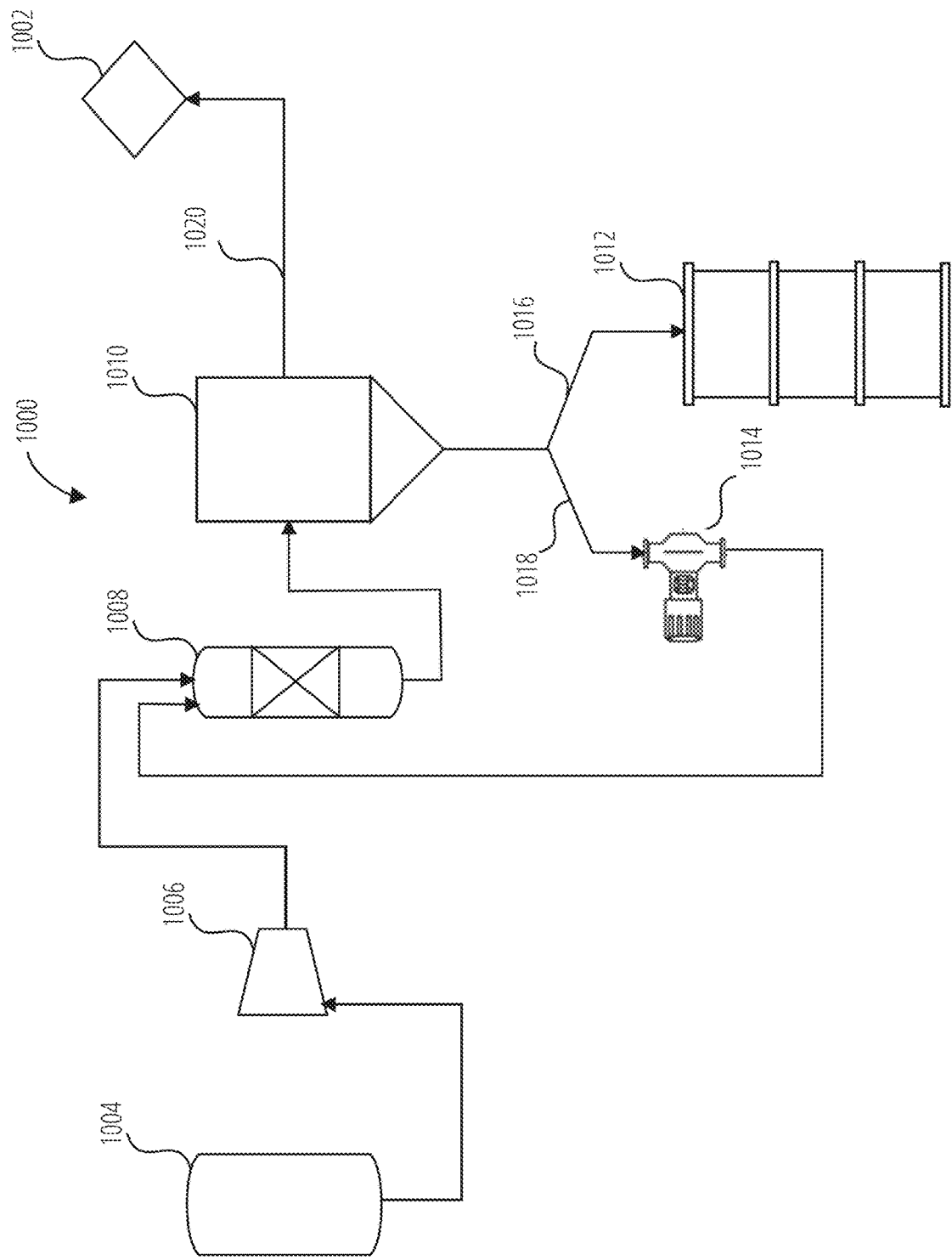
FIG. 10 is a process-flow diagram of a reactor system according to one embodiment disclosed herein.

FIG. 10 is a block diagram of a reactor system 1000 according to one embodiment disclosed herein. The reactor system 1000 includes a syngas vessel 1004, a compressor 1006, a reactor 1008, a separation/condensing device 1010, a re-pressurizer 1014, a collection vessel 1012, and a system exit 1002. The syngas vessel 1004 is configured to store syngas. Syngas is produced by gasification or other means. The syngas from the syngas vessel 1004 is fed to the compressor 1006, where the initial low pressure of less than about 100 BAR is increased to from about 100 BAR to about 350 BAR. The compressed syngas is then fed to the reactor 1008, which contains a catalyst (e.g., the catalyst 106 of FIG. 1, the catalyst 712 of FIG. 7, other catalysts, etc.). For example, the reactor 1008 (which may contain one or more reactor tubes 100) may contain a metal sulfide catalyst at an elevated temperature of about 250 degrees C. to 350 degrees C.

The reactor 1008 produces products such as carbon dioxide, methane, ethane, methanol, ethanol, butanol, propanol, and water among others. The products exit the reactor 1008 and are passed to a separation/condensing device 1010. The separation/condensing device 1010 separates liquid products into desirable products 1016 and undesirable products 1018. The desirable products 1016 are collected, in the collection vessel 1012, for further use. The undesirable products 1018 are re-pressurized (e.g., using the re-pressurizer 1014) and reintroduced into the reactor 1008. The undesirable products 1018 may exist in the reactor system 1000 as gas, liquid, or a mixture of the two depending upon pressure and temperature.

Tail gas 1020 from the reactor system 1000 is discharged in order to replenish the reactor 1008 with compressed syngas. The tail gas 1020 is separated from the liquids in the separation/condensing device 1010 and sent to the system exit 1002 to be used in other processes such as heat generation, combustion, steam generation, power generation, etc.

Figure 11:
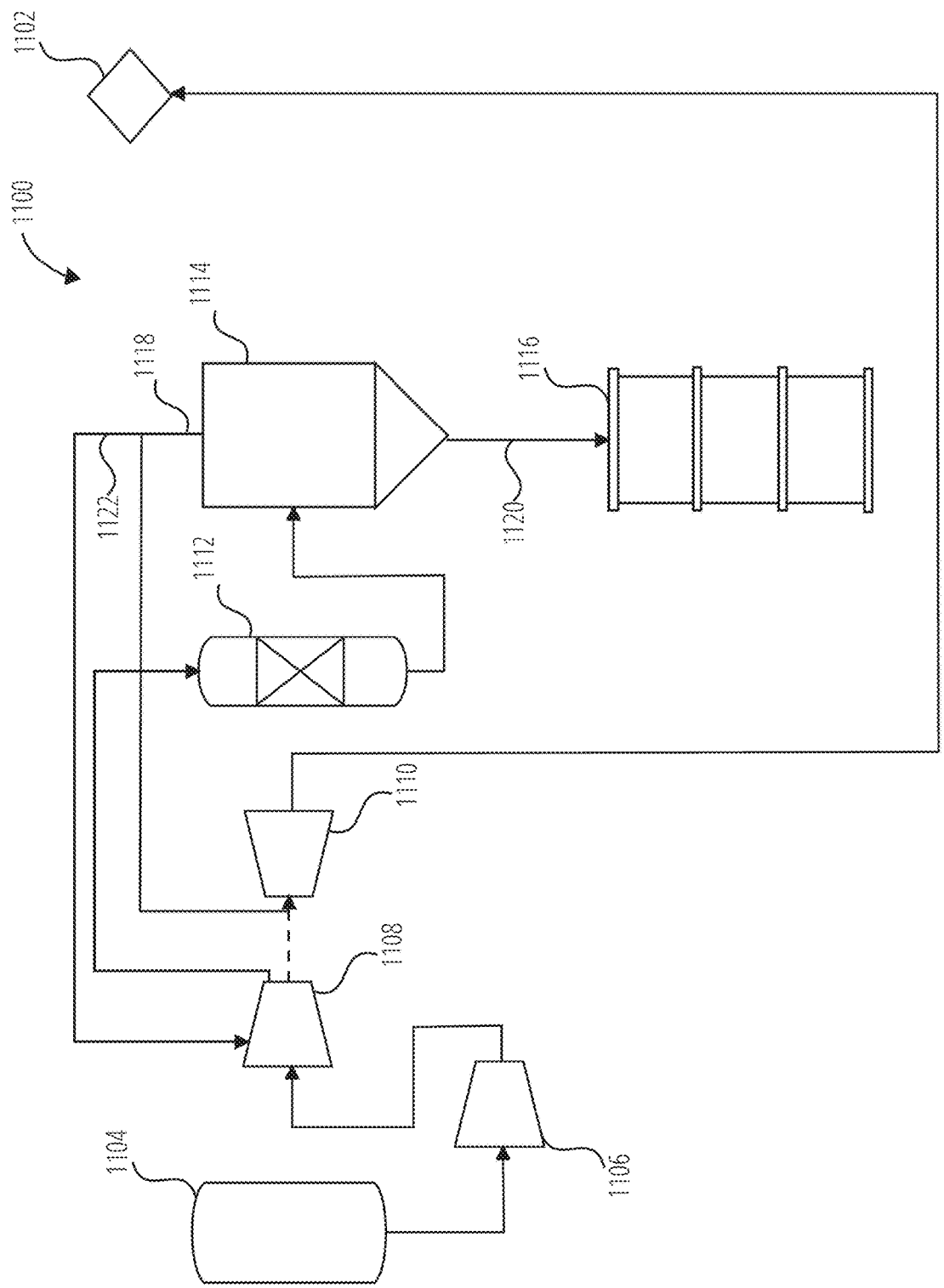
FIG. 11 is a process-flow diagram of a reactor system according to another embodiment disclosed herein.

FIG. 11 is a block diagram of a reactor system 1100 according to another embodiment disclosed herein. The reactor system 1100 includes a syngas vessel 1104, a compressor having a compressor stage one 1106 and a compressor stage two 1108, a reactor 1112 (which may contain one or more reactor tubes 100), a separation/condensing device 1114, a collection vessel 1116, a turbine 1110, and a system exit 1102. The syngas vessel 1104 is configured to store syngas. Syngas is produced by gasification or other means. The syngas from the syngas vessel 1104 is fed to a compressor including more than one stage (compressor stage one 1106, compressor stage two 1108). The stages of the compressor are sequential, each discharging into the next stage. Each stage further increases the pressure over the previous stage. The final compressor stage (compressor stage two 1108) discharges compressed syngas mixture into the reactor 1112. The reactor 1112 produces products 1120 such as carbon dioxide, methane, ethane, methanol, ethanol, butanol, propanol, and water among others. The products 1120 exit the reactor 1112 and are provided to the separation/condensing device 1114.

A portion of the tail gas 1118 is separated from the liquids in the separation/condensing device 1114 and sent to the system exit 1102 to be used in other processes such as heat generation, combustion, steam generation, power generation etc. The expansion/decompression of the tail gas discharge is used to drive a turbine 1110. The Turbine (104) provides energy to supplement the compressor, drive mechanical equipment, or generate electrical power. The remaining tail gas (recycled gas 1122), still at an elevated pressure, is fed to the inlet of the final compressor stage (compressor stage two 1108) where it is combined with the raw syngas, compressed, and returned to the reactor 1112.

The ratio of the recycled gas 1122 returned to the reactor is about between 75% to about 95%. The recycled gas 1122 serves to allow unreacted components to react. Additionally, the recycled gas 1122 serves to elevate component concentrations of the gas mixture of products such as carbon dioxide and methane. The elevated and recycled components serve to create an atmosphere inside the reactor 1112 where components such as methane and carbon dioxide exist in concentrations of ample quantity that the additional formation of these compounds is significantly impaired.

Figure 12:
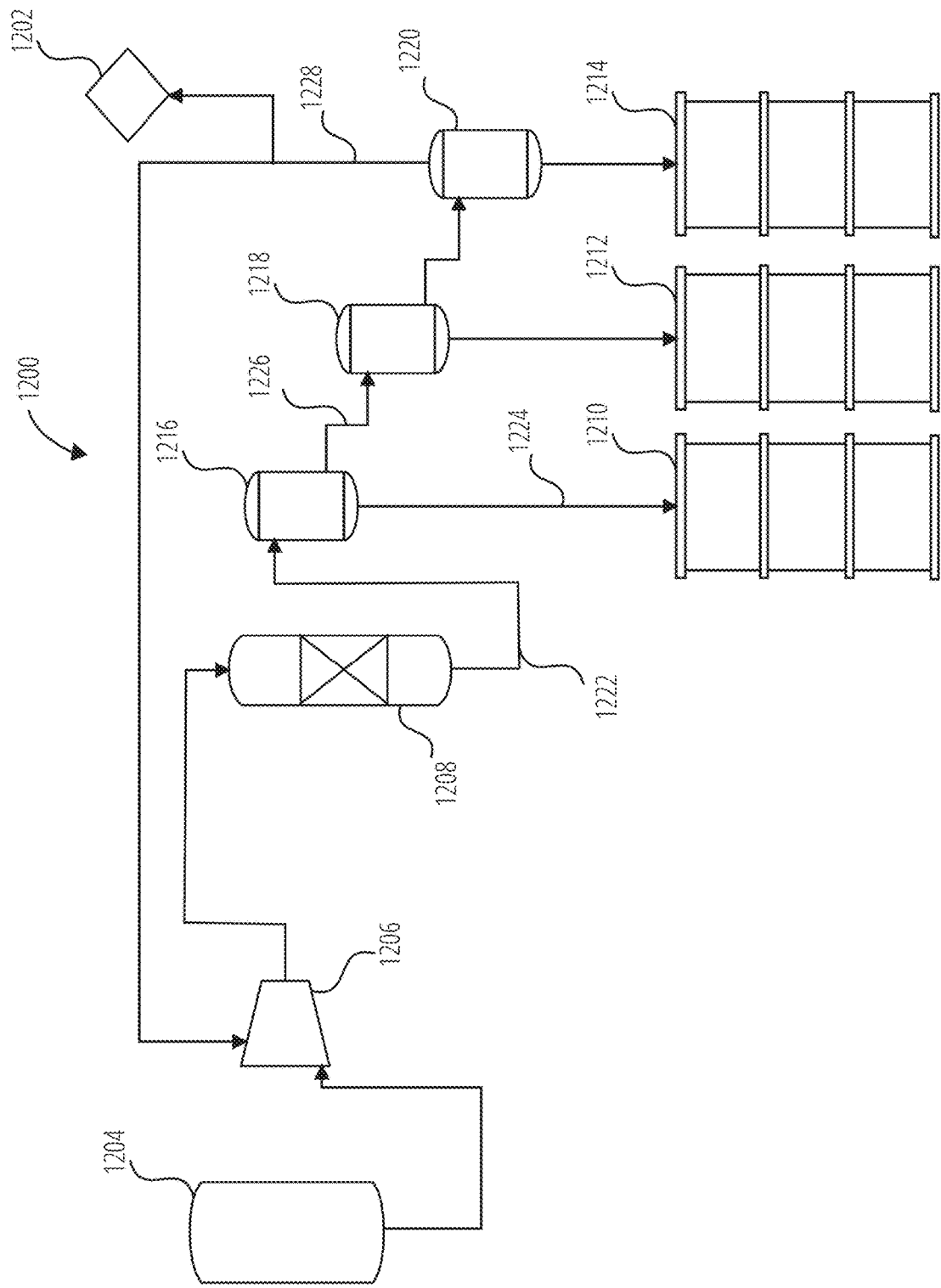
FIG. 12 is a process-flow diagram of a reactor system according to another embodiment disclosed herein.

FIG. 12 is a block diagram of a reactor system 1200 according to another embodiment disclosed herein. The reactor system 1200 includes a syngas vessel 1204, a compressor 1206, a reactor 1208 (which may contain one or more reactor tubes 100), separation vessels (e.g., a first separation vessel 1216, a second separation vessel 1218, a third separation vessel 1220, etc.), collection vessels (e.g., a first collection vessel 1210, a second collection vessel 1212, a third collection vessel 1214, etc.), and a system exit 1202. The syngas vessel 1204 includes syngas, which is fed to the compressor 1206. The compressor 1206 pressurizes the syngas and feeds the pressurized syngas to the reactor 1208. The reactor 1208 produces a mixture of products 1222. The mixture of products 1222 is fed to the first separation vessel 1216.

The separation vessels (e.g., the first separation vessel 1216, the second separation vessel 1218, and the third separation vessel 1220) are each controlled for temperature and pressure to allow for fractionated separation of liquid products utilizing the high pressure and temperature state of the mixture of products 1222 discharged from the reactor 1208. The first separation vessel 1216 condenses liquids 1224 for collection (e.g., in first collection vessel 1210) at the highest temperature and pressure. Any non-condensed products 1226 remain in a gaseous state and are transferred to any number of intermediate sets of separation vessels (e.g., the second separation vessel 1218, the third separation vessel 1220, etc.), repeating the liquid collection process for different products (e.g., into the second collection vessel 1212, the third collection vessel 1214, etc.). The final collection vessel (the third collection vessel 1214 in FIG. 12) in the series discharges the remaining gaseous products 1228 to be recycled to the reactor 1208 (e.g., via the compressor 1206) or provided to the system exit 1202.

Many FT type catalysts are damaged by hydrogen sulfide. As a result, measures are taken to ensure hydrogen sulfide is completely removed from the supply gas. A sulfur tolerant catalyst is beneficial for many sources of syngas because less gas cleaning and conditioning is required.

Metal sulfide catalysts are widely used in a variety of chemical reactors including reactors designed for the production of chemical products. Prior to use in the reactor, metal sulfide catalysts involve "activation" where metal oxides are converted to metal sulfides within the catalyst. This activation can be done prior to installing the catalyst within the reactor, ex-situ, or after the catalyst has been installed, in-situ.

Another activation method used for metal oxide catalysts is in-situ activation using dimethyl disulfate (DMDS). For this activation procedure, a mixture of DMDS and other compounds is circulated through the reactor at elevated temperature and pressure. The DMDS reacts with the catalyst forming hydrogen sulfide, the hydrogen sulfide reacts with the metal oxide to form metal sulfides within the catalyst.

Metal sulfide catalysts are sometimes activated by ex-situ sulfidation or "batch" processing. Batch processing involves activation of the catalyst in a separate vessel and loading of the activated catalyst into the chemical reactor. Safe handling of activated metal sulfide catalysts is a challenge and requires specialized procedures. Activated catalysts are reactive with oxygen and can even self-ignite in air. Additionally, activated catalysts can release toxic gasses when exposed to air or moisture.

Metal sulfide catalysts are often varied or "promoted" to optimize their production capacity for specific products, which can affect the activation procedure. Literature demonstrates that complete activation of metal sulfide catalysts can occur at temperatures far in excess of a normal operating range.

Methods for activating a metal sulfide catalyst in-situ within a reactor are also disclosed in the drawings and discussed below. The methods include bringing hydrogen sulfide into contact with a metal oxide containing catalyst, resulting in a desirable chemical reaction and activation of the catalyst to metal sulfide. The methods provide a procedure for achieving the optimized reaction temperature for activation without requiring an external process or excessive heating of the reactor beyond the operating and material design temperatures. This enables the handling and use of non-activated catalyst for filling reactors, allowing safety and cost reductions in commercial-scale deployment.

The methods disclosed herein can include packing a reactor having one or more reactor tubes (such as the reactor tube 100) with a suitable metal oxide catalyst and applying a suitable temperature and pressure environment to the reactor. The reactor tube may utilize a profiling thermocouple (or temperature monitoring device) to track the progression of the activation reaction. The activation process involves contact of the catalyst with a suitable flow of hydrogen sulfide containing gas within the reactor tube. The hydrogen sulfide containing gas is typically not syngas. The hydrogen sulfide converts the metal oxide into metal sulfide within the catalyst in a highly exothermic reaction that proceeds along the length of the reactor tube in the flow direction. The activation front and temperature profile can be monitored using the profiling thermocouple. The reactor temperature, pressure, and hydrogen sulfide flow rate are variables that can be optimized for achieving the optimal activation temperature for the particular desired properties of the activated catalyst.

A gaseous mixture containing hydrogen sulfide may be introduced at a controlled rate and pressure to any of the reactors disclosed herein. The temperature of the catalytic reactor can be at normal operating temperatures, such as 250-350 degrees Celsius, for the activation procedure, even though the conversion of metal oxides to metal sulfides during activation is highly exothermic in nature, many times more exothermic than the production of alcohols.

Figure 2:
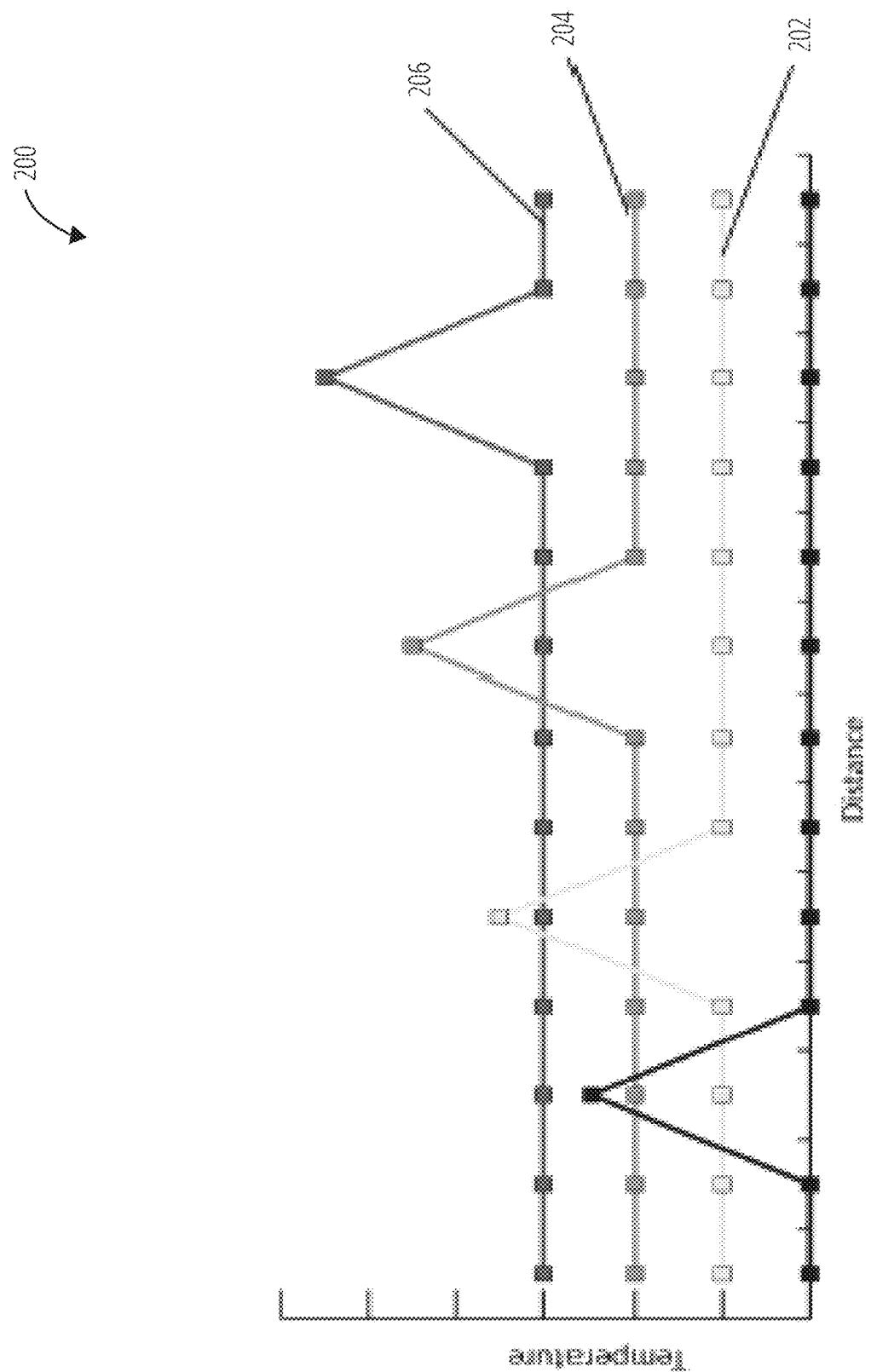
FIG. 2 is a graph illustrating a hypothetical example of temperature plotted as a function of distance along a catalyst bed of the individual reactor tube of FIG. 1 during activation of a catalyst.

FIG. 2 is a graph 200 illustrating a hypothetical example of temperature plotted as a function of distance along the catalyst bed 108 of the individual reactor tube 100 FIG. 1. The graph 200 of FIG. 2 shows the temperature of catalyst bed 108 at three different points in time during the activation of the catalyst 106 of FIG. 1 using a flow of gas containing hydrogen sulfide. In FIG. 2, a first plot 202 corresponds to a first point in time, a second plot 204 corresponds to a second point in time, and a third plot 206 corresponds to a third point in time.

An elevated temperature at any point along the catalyst bed 108 indicates that an activation reaction front is passing through that location within the catalyst bed 108. This profile can be monitored in-situ using the profiling thermocouple 112 of FIG. 1. The first plot 202 shows the activation front in a first third of the individual reactor tube 100 in the beginning of the activation process. The second plot 204 shows the activation front as it passes through the middle of the individual reactor tube 100. The third plot 206 shows the activation front as it nears the end of the individual reactor tube 100, signaling that the activation procedure is near completion. The manipulation of such parameters as external temperature, pressure, and hydrogen sulfide flow can provide an optimal temperature for activation during this procedure.

Figure 3:
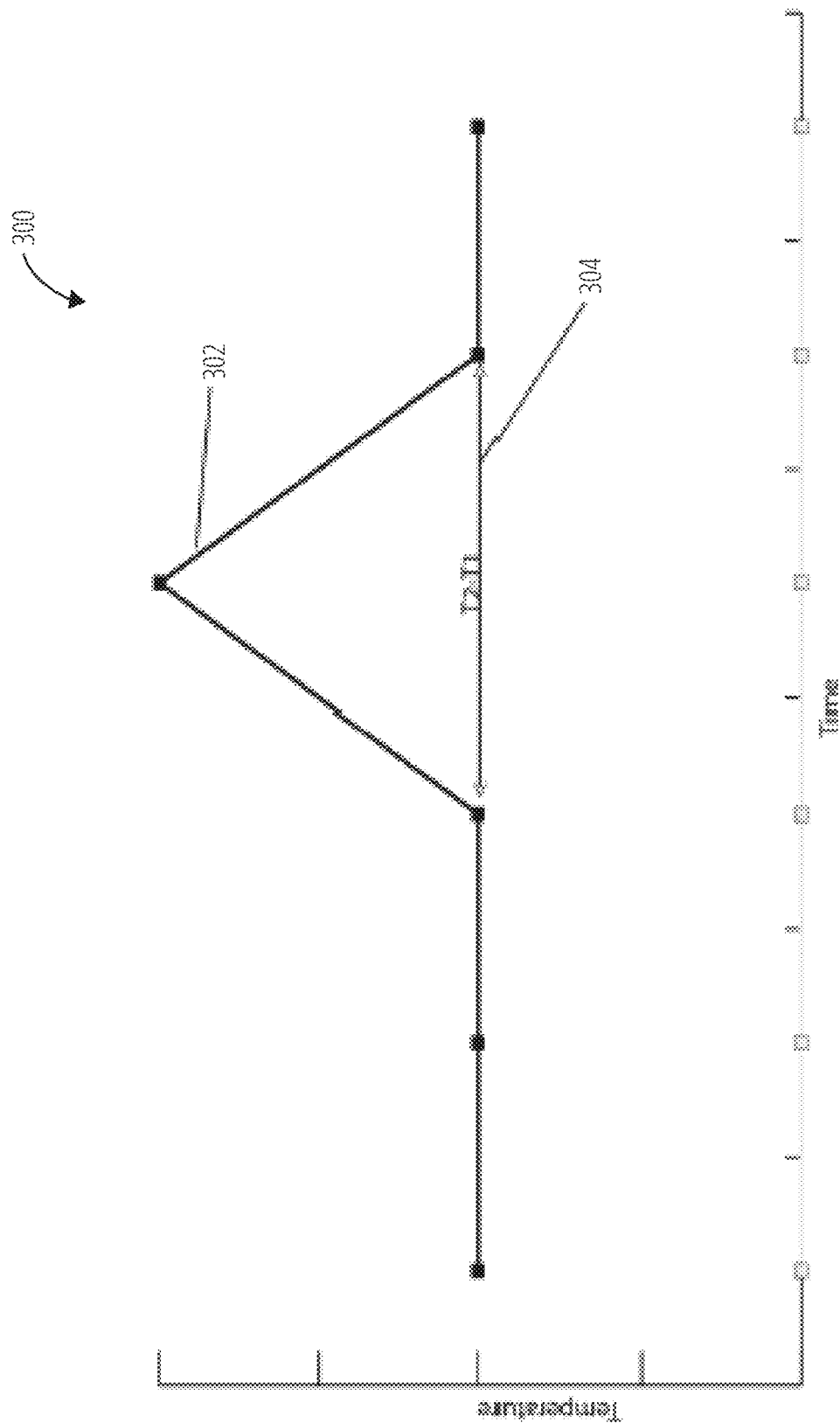
FIG. 3 is a graph showing a hypothetical example of temperature plotted as a function of time for a single point within the catalyst bed of the individual reactor tube of FIG. 1 during activation of a catalyst.

FIG. 3 is a graph 300 showing a hypothetical example of temperature plotted as a function of time for a single point within the catalyst bed 108 of the individual reactor tube 100 FIG. 1 during activation of the catalyst 106 using a flow of gas containing hydrogen sulfide. A temperature peak 302 at this point within the catalyst bed 108 occurs when the reaction front passes through the point. A magnitude of the temperature peak 302 can be important for insuring that the catalyst 106 is optimally activated. The magnitude of the temperature peak 302 may be manipulated by controlling an external temperature of the outer shell 102 and a reactor thermal fluid environment, controlling the reactor pressure, or controlling the flow and concentration of the hydrogen sulfide containing gas. The width 304 of the temperature peak 302 may be related to the heat released in the reaction and/or the width of the reaction zone.

Figure 4:
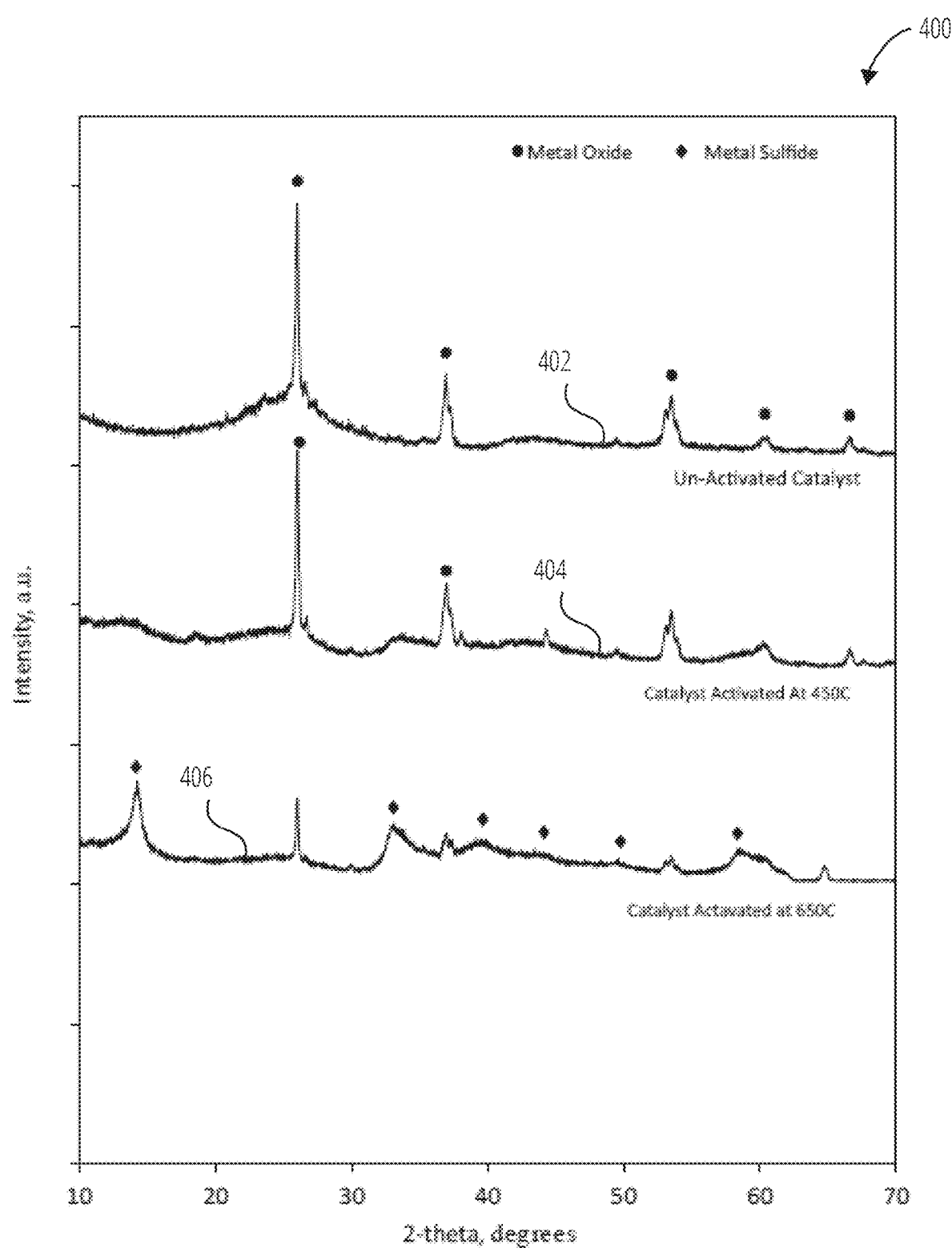
FIG. 4 is a graph illustrating impact of temperature on catalyst composition.

FIG. 4 is a graph 400 showing properties of an example catalyst (e.g., the catalyst 106 of FIG. 1) using a technique called X-ray diffraction (XRD). The graph 400 includes un-activated catalyst plot 402, a catalyst activated at 450 C plot 404, and a catalyst activated at 650 C plot 406. It can be seen that the metal oxide peaks present in the un-activated catalyst plot 402 are still present in the catalyst activated at 450 C plot 404. This indicates that the activation was incomplete. To those skilled in the art, it becomes apparent from the catalyst activated at 650 C plot 406 that the catalyst activated at 650 C has fully converted metal oxides to metal sulfides and thus is fully activated.

Full catalyst conversion occurs between 600 degrees C. and 900 degrees C., well outside the standard temperature range of some reactors. Using embodiments disclosed herein, the generated exotherm fully converts metal oxides to sulfides due to self-heating, and does not require excessive heating of the liquid thermal jacket of the reactor. The flow rate of the sulfur gas can be regulated at a low flow rate to generate a slow moving exotherm front so that the liquid thermal jacket can dissipate heat, but allow temperatures required for full conversion. Likewise, the pressure can be regulated to control the exotherm, with desired pressure ranges generally falling between 1 BAR and 100 BAR. For example, the reactor can be maintained at 350 degrees C., but the catalyst itself self-heats to 650 degrees C. for a long enough duration to achieve full conversion.

A different catalyst activation process where catalyst particles are immersed in a liquid would generally not allow for self-heating, as the liquid would rapidly conduct away heat from the catalyst particles.

The phrases "operably connected to," "connected to," "operably coupled to," "coupled to," and "in communication with" refer to any form of interaction between two or more entities, including mechanical, electrical, magnetic, electromagnetic, fluidic, and thermal interaction. Two entities may interact with each other even though they are not in direct contact with each other. For example, two entities may interact with each other indirectly through an intermediate entity.

It will be readily understood that the components of the embodiments as generally described herein and illustrated in the Figures herein could be arranged and designed in a wide variety of different configurations. For instance, the steps of a method do not necessarily need to be executed in any specific order, or even sequentially, nor do the steps need to be executed only once. Thus, the more detailed description of various embodiments, as described herein and represented in the Figures, is not intended to limit the scope of the disclosure, but is merely representative of various embodiments. While the various aspects of the embodiments are presented in drawings, the drawings are not necessarily drawn to scale unless specifically indicated.

EXAMPLES

An non-exhaustive list of example embodiments follows. In order to avoid complexity of the disclosure, not all of the examples are explicitly indicated as combinable with each other and with embodiments and examples provided above. Unless it would be apparent to one of ordinary skill in the art that these embodiments and examples are not combinable, however, it is contemplated herein that these embodiments and examples are combinable with each other.

Example 1

A catalytic reactor system comprising: one or more catalyst filled reactor tube(s); each containing one or more fluid flow internal tube(s) absent of catalytic reaction activity.

Example 2

The system of Example 1, further comprising of a thermal management device such as a shell or jacket used to control outer shell temperature conditions of reactor tube(s).

Example 3

The system of Example 1, further serves to use fluid flows within the reactor tube(s) and internal tube(s) for thermal management improvements.

Example 4

The mechanism wherein internal tube(s) absent of catalytic activity serve as a thermal barrier thus bounding in dimension the effective maximum radial span of catalyst contained within a reactor tube(s).

Example 5

A reactor tube wherein any non-zero sized internal tube has a maximum radial span of catalyst determined by the space between the internal tube wall and the reactor tube wall.

Example 6

The system of Example 5, wherein the reactor tube possesses a cross sectional area and volume of catalyst at least 4 times greater than a reactor tube without an internal tube with the same maximum radial catalyst width.

Example 7

The system of Example 1, having features of reactor inlet and outlet located at the same end, allowing the reactor design and construction to be supported at a single end.

Example 8

The system of Example 6, wherein the diameter of the reactor tube or the diameter of the internal tube can be selected in such a way that the sizing is optimized for characteristics such as fluid flow velocity, pressure rating, and/or flow while span remains constant.

Example 9

A process consisting of the catalyst reactor system of claim 1, whereby syngas is compressed with a compressor to a pressure of 100-350 Bar and fed to a metal sulfide catalyst at a temperature of 250-350 degrees C. to form reaction products including alcohols.

Example 10

The process of Example 9, whereby desired reaction products are separated in a separator or condenser and undesired products re-pressurized and recycled to the reactor.

Example 11

The process of Example 10, whereby the recycled products are re-pressurized in the final stage of a multiple stage compressor that is also used to compress the incoming syngas.

Example 12

The process of Example 10, whereby the desired reaction products are fractionated in a multiplicity of staged separators or condensers and the undesired products re-pressurized and recycled to the reactor.

Example 13

A reactor tube, comprising: an outer shell defining a catalyst bed; a catalyst within the catalyst bed; and an inner tube extending through the catalyst bed, an interior of the inner tube isolated from the catalyst within the catalyst bed.

Example 14

The reactor tube of Example 13, wherein a distance between an outside wall of the inner tube and an inside wall of the outer shell is about the same as a critical dimension of the catalyst.

Example 15

The reactor tube of Example 13, further comprising a plurality of inner tubes extending through the catalyst bed, the interiors of the plurality of inner tubes isolated from the catalyst within the catalyst bed.

Example 16

The reactor tube of Example 13, further comprising a profiling thermocouple including the inner tube, wherein the profiling thermocouple is configured to measure a temperature profile through the catalyst bed.

Example 17

The reactor tube of Example 13, wherein the inner tube extends through the outer shell and is sealed to the outer shell at a penetration interface where the inner tube interfaces with the outer shell.

Example 18

The reactor tube of Example 13, wherein: the outer shell has a first end and a second end opposite the first end; and the reactor tube further includes a fluid inlet proximate to the first end and a fluid outlet proximate to the first end.

Example 19

The reactor tube of Example 13, further comprising a fluid inlet and a fluid outlet positioned to direct fluid flows from the fluid inlet to the fluid outlet through at least substantially through an entire volume of the catalyst.

Example 20

A reactor vessel, comprising: an active reactor tube comprising: an outer shell; one or more inner tubes extending into a volume defined by the outer shell; and catalyst within a catalyst bed defined by outer walls of the one or more inner tubes and an inside surface of the outer shell, wherein passages inside of the one or more inner tubes are isolated from the catalyst by the outer walls.

Example 21

The reactor vessel of Example 20, further comprising one or more thermal reactor tubes, at least one of the one or more thermal reactor tubes comprising: a thermal outer shell; one or more thermal inner tubes extending into a thermal volume defined by the thermal outer shell; and a solid non-reacting media within a media bed defined by outer walls of the one or more thermal inner tubes and an inside surface of the thermal outer shell.

Example 22

The reactor vessel of Example 21, wherein the solid non-reacting media comprises glass beads.

Example 23

The reactor vessel of Example 21, wherein reactants that enter the one or more thermal reactor tubes flow through the solid non-reacting media, through the one or more thermal inner tubes, through outlets of the one or more thermal reactor tubes, into an inlet of the active reactor tube, and into the catalyst where the reactants react to form products.

Example 24

The reactor vessel of Example 23, wherein the products flow through the one or more inner tubes and an outlet of the active reactor tube.

Example 25

The reactor vessel of Example 20, further comprising one or more other active reactor tubes.

Example 26

The reactor vessel of Example 25, wherein each of the one or more other active reactor tubes includes: an active outer shell; one or more active inner tubes extending into a volume defined by the outer shell; and catalyst within an active catalyst bed defined by outer walls of the one or more active inner tubes and an inside surface of the active outer shell, wherein active passages inside of the one or more active inner tubes are isolated from the catalyst by the active outer walls.

Example 27

The reactor vessel of Example 20, wherein reactants enter the active reactor tube through the passages inside of the one or more inner tubes, then flow into the catalyst.

Example 28

The reactor vessel of Example 27, wherein a temperature of the reactants is less than a temperature of the catalyst.

While the foregoing is directed to certain embodiments, other and further embodiments may be devised without departing from the basic scope thereof, and the scope thereof is determined by the claims that follow.

What is claimed is:

1. A reactor, comprising:
    an active reactor tube comprising:
        an outer shell defining a catalyst bed;
        a catalyst within the catalyst bed; and
        an inner tube extending through the catalyst bed, an interior of the inner tube isolated from the catalyst within the catalyst bed, wherein a distance between an outside wall of the inner tube and an inside wall of the outer shell is about the same as a critical dimension of the catalyst; and
    a thermal reactor tube comprising:
        a thermal outer shell;
        one or more thermal inner tubes extending into a thermal volume defined by the thermal outer shell; and
        a solid non-reacting media within a media bed defined by an outer wall of each of the one or more thermal inner tubes and an inside surface of the thermal outer shell,
        wherein reactants that enter the thermal reactor tube flow through the solid non-reacting media, through the one or more thermal inner tubes, through an outlet of the thermal reactor tube, into an inlet of the active reactor tube, and into the catalyst where the reactants react to form products.

2. The reactor of claim 1, further comprising a plurality of inner tubes extending through the catalyst bed, the interiors of the plurality of inner tubes isolated from the catalyst within the catalyst bed.

3. The reactor of claim 1, further comprising a profiling thermocouple located and configured to measure a temperature profile through the catalyst bed.

4. The reactor of claim 1, wherein the inner tube extends through the outer shell and is sealed to the outer shell at a penetration interface where the inner tube interfaces with the outer shell.

5. The reactor of claim 1, wherein:
    the outer shell has a first end and a second end opposite the first end; and
    the active reactor tube further includes the inlet proximate to the first end and a fluid outlet proximate to the first end.

6. The reactor of claim 1, further comprising the inlet and a fluid outlet positioned to direct fluid flows from the inlet to the fluid outlet at least substantially through an entire volume of the catalyst.

7. The reactor of claim 1, wherein the products flow through the inner tube and an outlet of the active reactor tube.

8. The reactor of claim 1, wherein reactants enter the active reactor tube through a passage inside the inner tube, then flow into the catalyst.

9. A reactor, comprising:
    an active reactor tube comprising:
        an outer shell defining a catalyst bed;
        a catalyst within the catalyst bed; and an inner tube extending through the catalyst bed, an interior of the inner tube isolated from the catalyst within the catalyst bed; and a thermal reactor tube comprising:
a thermal outer shell;
one or more thermal inner tubes extending into a thermal volume defined by the thermal outer shell; and
a solid non-reacting media within a media bed defined by an outer wall of each of the one or more thermal inner tubes and an inside surface of the thermal outer shell,
wherein reactants that enter the thermal reactor tube flow through the solid non-reacting media, through the one or more thermal inner tubes, through an outlet of the thermal reactor tube, into an inlet of the active reactor tube, and into the catalyst where the reactants react to form products.

10. The reactor vessel of claim 9, wherein the products flow through the inner tube and an outlet of the active reactor tube.

11. The reactor vessel of claim 9, wherein reactants enter the active reactor tube through a passage inside the inner tube, then flow into the catalyst.

12. The reactor of claim 9, further comprising a plurality of inner tubes extending through the catalyst bed, the interiors of the plurality of inner tubes isolated from the catalyst within the catalyst bed.

13. The reactor of claim 9, further comprising a profiling thermocouple located and configured to measure a temperature profile through the catalyst bed.

14. The reactor of claim 9, wherein the inner tube extends through the outer shell and is sealed to the outer shell at a penetration interface where the inner tube interfaces with the outer shell.

15. The reactor of claim 9, wherein:
the outer shell has a first end and a second end opposite the first end; and
the active reactor tube further includes the inlet proximate to the first end and a fluid outlet proximate to the first end.

16. The reactor of claim 9, further comprising the inlet and a fluid outlet positioned to direct fluid flows from the inlet to the fluid outlet at least substantially through an entire volume of the catalyst.

17. A reaction system, the system comprising:
at least one compressor configured to receive synthesis gas at an initial pressure of less than about 100 BAR and increase the pressure of the synthesis gas to about 100 BAR to about 350 BAR; and
a reactor comprising the reactor of claim 9, wherein an inlet of the thermal reactor tube is operably connected to an output of the at least one compressor.

* * * * *